(12) United States Patent
Karpovsky et al.

(10) Patent No.: US 11,418,547 B2
(45) Date of Patent: Aug. 16, 2022

(54) COMMON FRAMEWORK FOR TRANSLATING CUSTOMER FEEDBACK TO STANDARD AND SHAREABLE POLICY CHANGES OF CLOUD THREAT DETECTION SERVICE

(71) Applicant: MICROSOFT TECHNOLOGY LICENSING, LLC, Redmond, WA (US)

(72) Inventors: Andrey Karpovsky, Kiryat Motzkin (IL); Yotam Livny, Gadera (IL); Fady Nasereldeen, Daliyat-al Carmel (IL); Tamer Salman, Haifa (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 199 days.

(21) Appl. No.: 16/660,225

(22) Filed: Oct. 22, 2019

(65) Prior Publication Data

US 2021/0120043 A1    Apr. 22, 2021

(51) Int. Cl.
*H04L 9/40* (2022.01)
*H04L 29/06* (2006.01)

(52) U.S. Cl.
CPC ................ *H04L 63/205* (2013.01)

(58) Field of Classification Search
CPC ....... H04L 63/205; H04L 63/20; H04L 63/14; H04L 63/1408; H04L 63/1416; H04L 63/1425; H04L 63/1433
See application file for complete search history.

(56) References Cited

U.S. PATENT DOCUMENTS

| | | | |
|---|---|---|---|
| 2010/0083375 A1* | 4/2010 | Friedman | G06F 16/217 726/22 |
| 2016/0117202 A1* | 4/2016 | Zamer | G06N 20/00 719/320 |
| 2017/0286671 A1* | 10/2017 | Chari | G06F 21/552 |
| 2019/0108341 A1 | 4/2019 | Bedhapudi et al. | |
| 2019/0303573 A1 | 10/2019 | Chelarescu et al. | |

OTHER PUBLICATIONS

"International Search Report and Written Opinion Issued in PCT Application No. PCT/US20/054880", dated Dec. 18, 2020, 13 Pages.

* cited by examiner

*Primary Examiner* — Edward Zee
(74) *Attorney, Agent, or Firm* — Workman Nydegger

(57) ABSTRACT

Embodiments are provided for integrating feedback into alert managing processes having defined alert policies. These policies define conditions that, when satisfied by certain detected activities, triggers an alert to be sent to a client. A determination is made that a current detected activity does satisfy the condition(s). Subsequent to determining that the set of conditions is satisfied and prior to actually generating the alert, the current detected activity is determined to share a relationship with previously received feedback that caused the alert policy to be modified. After being modified, the alert policy specified whether the alert is to be sent to the client, modified and then sent, suspended, or disabled. The alert is then either generated or refrained from being generated based on the alert policy.

14 Claims, 9 Drawing Sheets

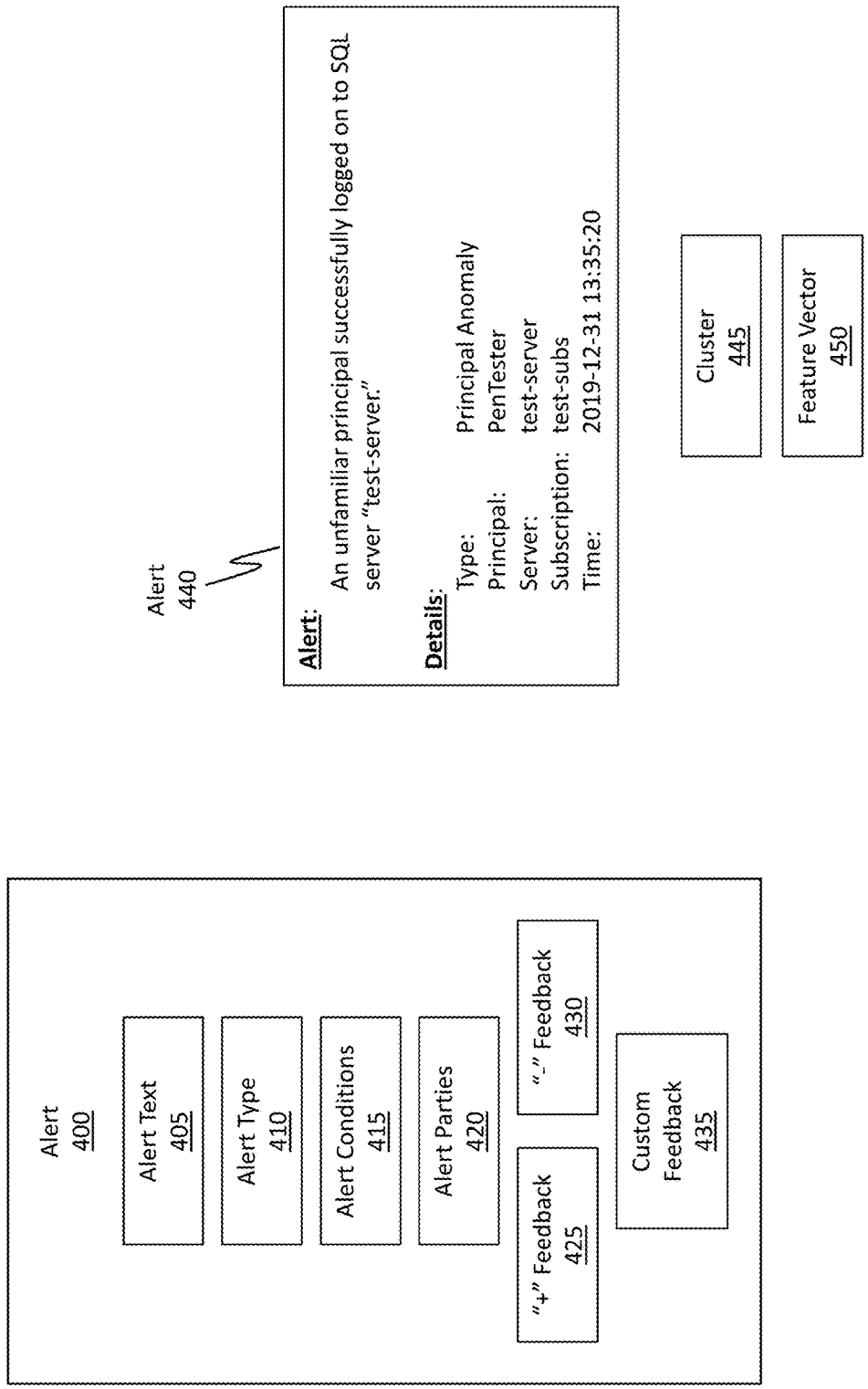

COMMON FRAMEWORK FOR TRANSLATING CUSTOMER FEEDBACK TO STANDARD AND SHAREABLE POLICY CHANGES OF CLOUD THREAT DETECTION SERVICE

BACKGROUND

Threat detection services or, more generally "activity detection" services, are a large part of security for cloud services. These services are generally designed to alert security officers of potential breaches (such as data leak or unauthorized access). Activity detection commonly consists of several distinct yet closely related components. For instance, activity detection often includes detection logic that monitors input data, processes that data (e.g., using machine learning or rule-based algorithms), and then outputs security signals. Activity detection also often includes an alerting service capable of sending some type of alert (e.g., an email or push notification) based on signals generated by the detection logic. A feedback loop is sometimes also used, where the feedback loop allows a customer or client to respond to received alerts with feedback suggesting certain improvements. Finally, some activity detection schemes also use a policy management service to govern the application of the detection logic and the alerting service.

Current detection logic is uniformly probabilistic, which can make false positives very prevalent. This prevalence has led to systems attempting to control the false positive rate, but those controls are often at the cost of increasing false negatives. Controlling the systems with traditional techniques has led to increased rates of false negatives, which is also undesirable (e.g., increases in noisiness can lead to alert churn).

When dealing with activity detection in a cloud context, detection logic is often a generic framework aimed to work effectively over a maximum percentage of clients and adapted to each client by preset individual thresholds and variables. Such configurations have downsides, however, in that the preprogrammed and generic logic might not be optimal for all customers and all types of computing environments. For example, the detection algorithm may detect an access request arising from an unfamiliar location. If the location is valid, the detection algorithm may raise an alert even when the alert is not needed. Likewise, when a new set of users in an enterprise are setting up their accounts and establishing passwords, this type of activity might unnecessarily trigger system alerts that are unnecessary and undesired.

Based on customer studies and feedback, the most common cause of dissatisfaction with alerts raised in response to activity detection occurs when alerts are triggered by expected (even if statistically abnormal) events. Examples include logins coming from a new username belonging to a new employee, increased traffic during backup or migration procedures, and so forth.

Existing alert systems are also somewhat inflexible in the manner in which alerts are generated and presented to different user's having different needs and preferences.

Accordingly, there is an ongoing need and desire for improved techniques for generating more accurate and individualized alerts and for allowing customers greater flexibility and control over the manner in which alerts are generated and presented.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, methods, and devices that are configured to integrate user feedback into alert processes.

In some embodiments, a base alert policy is identified. This base policy defines a set of one or more condition(s) that, when satisfied by certain detected activity, triggers an alert to be sent to one or more corresponding clients. A determination is made that current detected activity does satisfy the set of condition(s). Subsequent to determining that the set of condition(s) is satisfied and prior to actually sending and/or generating the alert, the current detected activity is determined to share a relationship with previously received feedback that caused the alert policy to be modified (e.g., changed, suspended, muted, etc.). After being modified, the alert policy specifies whether the alert is to be sent to the client (in a modified or unmodified state), or suspended, or disabled. The alert is then either generated or refrained from being modified, generated and/or sent based on the alert policy.

In some embodiments, a particular security incident is identified. This incident occurred in response to a detected activity being performed in a usage context of a resource. Prior to generating an alert for the security incident, a determination is made as to whether previous feedback has been received in response to previous alerts that were sent when previous activity was performed for that same usage context. After ensuring that the alert, which is generated in response to the security incident, includes attributes reflective of the previous feedback, the alert is sent to a client. New feedback is received, where this new feedback details a requested alert configuration change. Subsequent to translating the new feedback into a standard form by removing client data, the alert policy is modified. This modification occurs by incorporating the requested alert configuration change into the alert policy. As a consequence, the alert policy is now configured to cause a subsequent alert, which is associated with the same usage context, to be configured in accordance with the requested alert configuration change.

In some embodiments, client behavior (or activity) is monitored for multiple different clients over a period of time. This client behavior is specifically monitored with regard to a usage context of a resource. As a part of this monitoring process, a clustering process is performed on multiple alerts that are issued during the period of time. These alerts were issued in response to security incidents that occurred during the time period and that were associated with the usage context. For each one of the alerts, a determination is performed as to whether alert-related feedback was provided from the clients. Here, at least some of the feedback is grouped to form a collection of feedback, where the collection is associated with the usage context. In response to identifying an alert configuration change request identified from within the collection of feedback, subsequent alerts are customized in accordance with the change request. These customized alerts are provided to clients whose subsequent activities are associated with the usage context of the resource.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered limiting in scope, embodiments will be described and explained with additional specificity and detail through the use of the accompanying drawings in which:

FIGS. 4A and 4B illustrate different attributes of an alert.

DETAILED DESCRIPTION

Figure 1:
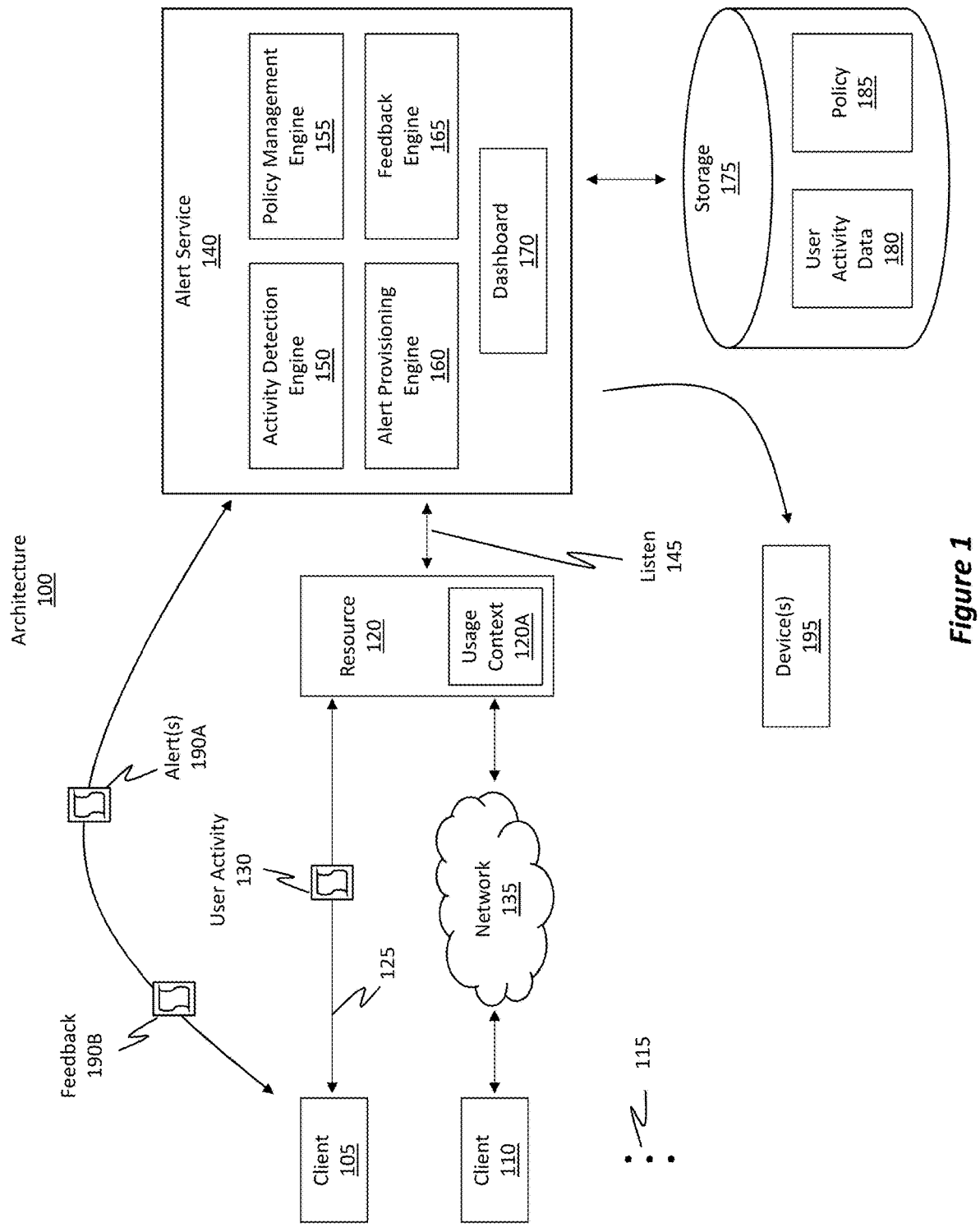
FIG. 1 illustrates an example architecture structured to enable feedback to be incorporated into an alert managing system.

Embodiments disclosed herein relate to systems, methods, and devices that dynamically integrate feedback into an alert managing system or architecture.

In some embodiments, an alert policy is identified. This policy defines a set of one or more condition(s) that triggers an alert to be sent to a client. Subsequent to determining that the set of condition(s) is satisfied by current activity but prior to actually generating the alert, the current activity is determined to share a relationship with previously received feedback that caused the alert policy to be modified. The alert policy now specifies how the alert is to be managed with regard to the client.

In some embodiments, a security incident is identified. This incident occurred in response to a detected activity being performed in a usage context of a resource. Prior to generating an alert for the security incident, a determination is made as to whether previous feedback has been received in response to previous alerts that were sent when previous activity was performed for that same usage context. After ensuring that the alert includes attributes reflective of the previous feedback, the alert is sent to a client. New feedback is received, where this feedback details a requested alert configuration change. Subsequent to translating the new feedback into a standard form, the alert policy is modified in accordance with the configuration change request.

In some embodiments, client behavior (i.e. activity) is monitored for multiple clients. This client behavior is specifically monitored with regard to a usage context of a resource. As a part of this monitoring process, a clustering process is performed on multiple alerts that were issued for the usage context. For each one of the alerts, a determination is performed as to whether feedback for the alerts was received from the clients. At least some of the feedback is then grouped to form a collection of feedback, with the collection being related to the usage context. In response to identifying an alert configuration change request identified from within the collection of feedback, subsequent alerts are customized based on the change request.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

Some of the disclosed embodiments operate to define a standardized framework for certain client actions that are performed in response to those clients receiving an alert. Some of these actions include submitting feedback, disabling alerts, modifying alerts, suppressing alerts, and so on (as will be described in more detail later). The disclosed principles enable clients to influence the activity detection service by intelligently and dynamically modifying policy, updating a detection algorithm model, and even modifying severity metric changes. Additionally, the embodiments integrate an improved feedback loop into the activity detection system.

This improved feedback loop is integrated in such a way that it connects various components in the system in a unified platform and allows for the free flow of information. Such connectivity seamlessly improves customer experience, allows for enhanced control of received alerts, and even expands and improves the detection logic.

One major advantage of the disclosed embodiments relates to improvements in customer experience by allowing seamless and precise control of alerts at an individual level (e.g., by whitelisting known resources, silencing alerts during testing periods, etc.). Such a process addresses the most common cause of dissatisfaction with activity detection services in a cloud context (as described earlier), where generic probabilistic solutions are provided for a broad spectrum of client applications.

Another major advantage of the disclosed embodiments relates to allowing knowledge transfer. That is, since the platform is standardized, specific patterns of changes chosen by a client can be transferred (e.g., as recommendations or as default settings) to other clients identified as having similar attributes or being involved in similar situations (e.g. similar configuration settings for applications receiving similar sets of alerts). Such a process allows for the effective propagation of knowledge among clients, leverages the advantages of the cloud service, and helps in building a learning and adaptive platform for activity detection.

Example Architecture for Integrating Feedback

Attention will now be directed to FIG. 1, which illustrates an example architecture 100 that is structured or configured to integrate feedback received from any number of client devices into an alert management process. Initially, architecture 100 is shown as including any number of client devices, such as client 105 and client 110. The ellipsis 115 demonstrates how any number of clients may be included, associated, or involved with the architecture 100, without limit. One will appreciate how these client devices can be any type of computing device. Examples of client devices include, but are not limited to, laptops, desktops, mobile devices, tablets, servers, data centers, wearable devices, and so forth.

The client devices (e.g., clients 105 and 110) are able to access and interact with a resource 120. As used herein, the term "resource" should be interpreted broadly to include any kind or type of computing service, process, storage, hardware, software, or any other feature that a computing device can provide to a user or to another device.

In some cases, resource 120 is a client account. This client account may be operating on a local device, a networked system, or even in a cloud computing environment. In some instances, the client account can be a tenant (i.e. a group of users who share common privileges or access abilities to a set of computing resources, including software resources and hardware resources). The client account may be configured to provide software as a service (SaaS) functionality to a client, platform as a service (PaaS) functionality, and even infrastructure as a service (IaaS) functionality. In some cases, the client account may be configured to provide any type of software functionality and/or hardware functionality, without limit. As such, any references to a "client account" should be interpreted broadly.

Relatedly, resource 120 may include any type of hardware device, such as a server, a data center, or any other computing device. As such, resource 120 may include hardware and/or software.

Clients 105 and 110 are able to interact with resource 120 to obtain any services (e.g., computing services, storage services, etc.) provided by the resource 120. The manner in which client 105 and client 110 interact with resource 120 is referred to herein as a usage context 120A.

By way of example, if client 105 were accessing a specific feature or service provided by resource 120, then usage context 120A would include the set of circumstances, interactions, interchanges, contacts, connections, and associations that occur between client 105 and resource 120. In some cases, resource 120 may be able to provide a plethora of different services to different clients. If client 105 were accessing only a limited set of these services, then the usage context 120A would be limited to only those services that client 105 was accessing as opposed to including the entirety of the services that resource 120 is capable of providing. In this regard, usage context 120A may be limited in scope to correspond to the actual interactions that client 105 is having with resource 120.

The clients (including client 105 and 110) can interact with resource 120 in any number of ways. FIG. 1, for example, shows how client 105 is directly interacting with resource 120 via a direct connection 125. This direct connection 125 may be in the form of a wired connection (e.g., ethernet, universal serial bus USB, and so forth) or a wireless connection (e.g., wireless fidelity WiFi, Bluetooth, near field communication NFC, and so forth). With this direct connection 125, user activity 130 is being performed.

As used herein, user activity 130 refers to the specific interactions a client is having with resource 120. Whereas user activity 130 can refer to the client 105's specific interactions, usage context 120A is generally broader in scope and refers to the general interactions a client is having with resource 120. As will be described in more detail later, if the user activity 130 is determined to be abnormal (e.g., a behavior associated with user activity 130 is beyond a behavior threshold or beyond an acceptable variance threshold), then it is desirable to raise an alert to a client (either to the client engaged in the user activity 130 or perhaps to another client) to inform the client of the abnormality, the irregular behavior, or the suspicious behavior.

In some instances, clients can communicate or interact with resource 120 in an indirect manner, such as through a network 135. Of course, network 135 can be any type of network such as, but not limited to, a local area network (LAN), a wide area network (WAN), the Internet, a cloud network, an enterprise network, and so forth, without limitation.

In accordance with the disclosed principles, architecture 100 also includes an alert service 140. Alert service 140 may be a cloud computing service operating in a cloud environment, a local instance operating on a local device, an instance operating in a data center, or any other network service. In some cases, alert service 140 is operating on a same device as the one hosting the resource 120 while in other cases alert service 140 is operating on a separate device. Alert service 140 is highly dynamic and may be implemented on any device within architecture 100, without limit.

As will be described in more detail later, alert service 140 is able to listen 145, monitor, eavesdrop, detect, intercept, and/or detect any interactions involving the resource 120. As such, alert service 140 is able to monitor the user activity 130 of client 105 and any activity of client 110 relative to the resource 120. Alert service 140 is able to determine how often and to what extent clients are using or interacting with resource 140. In some cases, the listen 145 operation is a passive operation performed as a background service while in other cases the listen 145 operation is performed as an active operation.

Alert service 140 is shown as including a number of different so-called "engines" and other features. As used herein, the term "engine" (and its analogous terms) can refer to hardware processing units or to software objects, routines, or methods that may be executed on a computer system. Further detail regarding processing units and software routines will be provided later in connection with FIG. 8.

Some of these engines include an activity detection engine 150, a policy management engine 155, an alert provisioning engine 160, and a feedback engine 165. Alert service 140 is also shown as including a dashboard 170.

The activity detection engine 150 is able to monitor (e.g., using detection logic) how the clients are interacting with the resource 120. In this regard, activity detection engine 150 is able to perform the listen 145 operation discussed earlier. In some cases, activity detection engine 150 performs its listening operations by way of a network sniffer or perhaps even by examining network traffic passing to and from the resource 120. Activity detection engine 150 is able to categorize and classify the traffic based on which client device the traffic is associated with and is able to further classify the traffic based on the usage context 120A.

Alert service 140 either includes or is able to communicate with a storage repository, such as storage 175. This storage 175 is able compile and maintain any type or amount of user activity data 180, which generally describes the interactions the clients are having with resource 120. User activity data 180 may include telemetry data, actual network traffic data, request data, training data, and so forth. The user activity data 180 may be used to train a model to identify preferences from one or more users with regard to how alerts are to be configured.

The policy management engine 155 maintains, modifies, updates, and/or implements policy (i.e. a set of rules defining how resource 120 is permitted to be interacted with as well as rules for other operations, such as features or attributes related to alerts). This policy can be retained within the storage 175, as shown by policy 185. As will be discussed in more detail later, the policy 185 may define aspects related to structuring and sending alerts to clients (e.g., perhaps client 105, client 110, other device(s) 195, or other administrators/users).

The alert provisioning engine 160 is configured to generate and transmit alerts, such as alert(s) 190A to clients based on activity associated with the resource 120. A detailed description regarding alert(s) 190A will be provided later, but by way of a brief introduction, alert(s) 190A may be used to inform the client regarding suspicious activity, unauthorized activity or attempts, security-related events, potential malicious or suspicious user activity, and so forth, as identified by the activity detection engine 150 within the user activity 130. Previously recorded user activity data, such as user activity data 180, can be used to train the activity detection engine 150 in determining what types of activities are to be flagged as being suspicious and should raise an alert. The alert provisioning engine 160 can be used to send alert(s) 190A to clients based on the rules or triggering conditions defined within the policy 185. In some cases, as will be described later, the alert can additionally or alternatively be sent to another device, such as device(s) 195.

The feedback engine 165 is configured to integrate client-provided feedback into the policy 185. That is, when an alert is sent to a client, the alert is structured in a manner to enable the client to provide his/her own feedback (e.g., feedback 190B) regarding any attribute, parameter, or characteristic associated with the alert. By providing feedback, the user can train the alert service 140 regarding his/her preferences on how alerts are to be configured.

By way of example, if a user attempted to access resource 120 from a new device, a security alert may be raised informing the user of the unrecognized new device. If the access request is legitimate, then the alert may have been unnecessary. In this case, the user can provide feedback to inform the feedback engine 165 that subsequent alerts related to the new device (or perhaps even to other identified new devices) are unnecessary and should not be sent to the user. The feedback engine 165 is able to receive the user-provided feedback and either instruct the policy management engine 155 to modify the policy 185 based on the feedback or to modify the policy 185 itself.

Dashboard 170 refers to an interactive feedback mechanism that is accessible to a client to enable the client to provide or enter the feedback. In some cases, dashboard 170 may be included as an executable script embedded or otherwise included with the alert. When the alert is delivered, the client user can access the dashboard 170 to provide the feedback. In other cases, the dashboard 170 is a linkable service operating in a network, and the client can access the dashboard 170 via a link provided with the alert. Additional details regarding these various engines and structures will be provided throughout the remaining parts of this disclosure.

Example Technique(s) for Integrating Feedback

Figure 2:
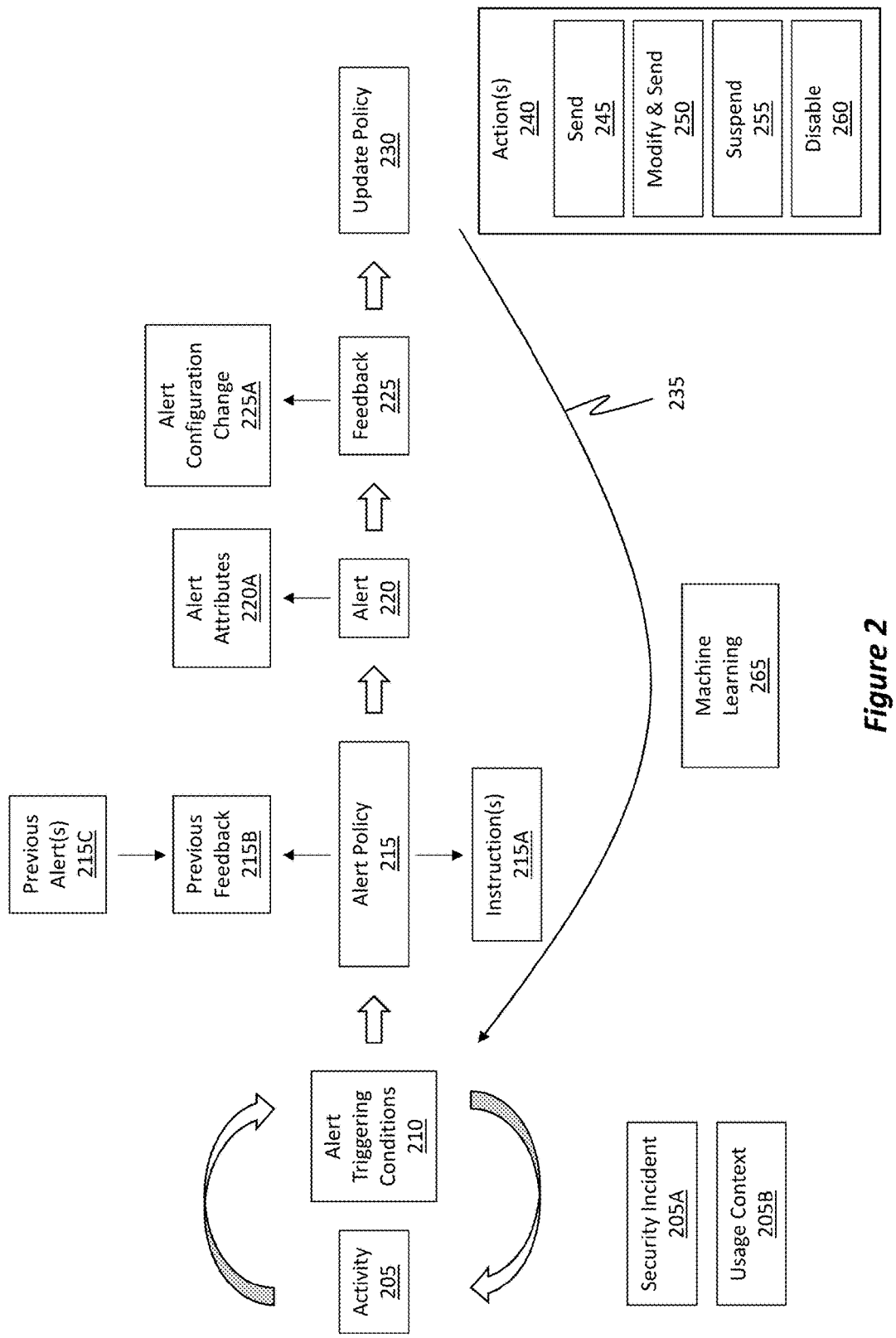
FIG. 2 illustrates a flow diagram of an example technique for incorporating feedback into an alert managing process.

FIG. 2 illustrates an example process 200 for integrating feedback into an alert management scheme. Process 200 may be performed by the various structures, engines, and devices that were mentioned in architecture 100 of FIG. 1.

Initially, activity 205 (e.g., user computing behavior) is monitored. Activity 205 should be interpreted broadly to include any type of activity, including network traffic activity, client device activity, resource usage activity, and so forth.

As an example, activity 205 may be representative of the user activity 130 shown in FIG. 1 where the client 105 is interacting with and consuming features provided by resource 120. In some cases, activity 205 may be related to a security incident 205A (i.e. a security-related event or occurrence).

Examples of security incident 205A include, but are not limited to, an authorization request to access and/or use a resource (e.g., resource 120 from FIG. 1), a detection of a suspicious or malicious event occurring in connection with the resource, and so forth. Additionally, activity 205 is monitored to determine its relationship or applicability relative to the resource (e.g., how the resource is being used, what processes or services of the resource are being used or requested, etc.). In this regard, activity 205 will be related to a specific usage context 205B associated with the resource.

While activity 205 is occurring and being monitored, activity 205 is either continuously or periodically evaluated against a set of alert triggering conditions 210. Alert triggering conditions 210 may be defined by the policy 185 illustrated in FIG. 1 and may be managed by the policy management engine 155. The alert triggering conditions 210 include any type of definable or trackable condition, such as, but not limited to, a frequency of use of the resource, a minimum severity condition related to the use of the resource, a duration of use of the resource, an identity of the entity using or requesting to use the resource, an amount of computational expense performed in using the resource, and others.

If the activity 205 satisfies the alert triggering conditions 210 (e.g., the frequency of use satisfies a threshold or conditional requirement, or the duration satisfies a threshold requirement, and so forth), then the process 200 may proceed to a subsequent step. If, on the other hand, the activity 205 does not satisfy the alert triggering conditions 210, then the cycle will repeat and the activity 205 will continue to be monitored (e.g., by the activity detection engine 150 from FIG. 1). Generally, if the alert triggering conditions 210 are satisfied, it means that an alert should be sent to an interested party. This alert may be sent to the client device producing the activity 205, to an administrator, or even to another device (as will be described in more detail later).

In response to a determination that activity 205 satisfies the alert triggering conditions 210 and prior to any alerts actually being generated, process 200 shows how an alert policy 215 may be queried, consulted, or otherwise evaluated. This alert policy 215, which may be included as a part of policy 185 from FIG. 1 and which may be applicable to any number of clients, may dictate specific conditions with regard to how an alert to is to be sent, where the alert is to be sent, when the alert is to be sent, and what information is to be included in the alert (i.e. collectively referred to herein as "attributes" associated with the alert).

The alert policy 215, when implemented, generates or modifies a set of instruction(s) 215A detailing or defining the attributes of the alert. For instance, the instruction(s) 215A can define a time period for sending the alert, a destination address for the alert, a protocol to use to send the alert, and what information is to be included in the alert. Stated differently, some embodiments modify (e.g., based on the alert policy 215) an instruction (e.g., instruction(s) 215A) to indicate at least one of: how the alert is to be presented, when the alert is to be presented, to which set of one or more clients the alert is to be presented, and which content is to be included in the alert.

In accordance with the disclosed principles, the embodiments are also able to dynamically modify the alert policy 215 to enable the alert policy 215 to be updated in response to user feedback. By way of example, any amount of previous feedback 215B may be received, where the previous feedback 215B is related to a specific usage context of the resource. Of course, because the resource can be associated with any number of different usage contexts, the embodiments are able to receive any amount of feedback for any number of the different usage contexts.

It should be noted that the previous feedback 215B is often associated with previous alert(s) 215C. That is, as described earlier, the embodiments are able to generate and send alerts to different client devices based on detected activity associated with a resource. If the activity satisfies a particular condition (e.g., alert triggering conditions 210), then an alert may be raised. In this regard, the previously received client feedback may have been previously received in response to a previously generated alert, which is identified as sharing one or more common attributes with the alert or with the activity 205. In some cases, the previously generated alert was provided to a previous client based on a particular activity that was being performed and that satisfied the condition.

The embodiments provide a user of a device that received the alert with an opportunity to provide feedback regarding a usefulness, practicality, applicability, or other characteristic of the alert. For instance, if the client device received an alert when no alert was needed (e.g., a false positive), then the user can provide feedback indicating that subsequent alerts for similar activity should not be raised, or rather, that subsequent alerts should be prevented or refrained from being transmitted to the client. Stated another way, in some embodiments, a requested alert configuration change provided in feedback can request that subsequent alerts associated with the usage context of the resource should be prevented from being sent to the client, to another client, to a user, or to any other receiving entity that previously received alerts.

By performing these operations, the embodiments are able to continuously monitor and gauge the effectiveness and applicability of any alerts that are sent to client devices. By intelligently responding to the feedback (e.g., previous feedback 215B) received in relation to previous alert(s) 215C, the embodiments are effectively able to learn, grow, and dynamically adapt to the different configuration preferences of different users.

Accordingly, before or prior in time to when an alert is actually generated, process 200 involves an operation of consulting or evaluating the alert policy 215 to determine whether previous feedback 215B has been received for the current activity 205 or the current usage context 205B associated with the current activity 205. If the alert policy 215 was previously modified to integrate or incorporate the previous feedback 215B, the process 200 ensures that the most recent or most up-to-date version of the alert policy 215 will be enforced.

Subsequent to evaluating the alert policy 215, process 200 then involves generating an alert 220 (or perhaps refraining from generating the alert 220, depending on the alert policy 215). This alert 220 will be structured or otherwise configured in a manner to comply with the alert policy 215. That is, the alert attributes 220A (e.g., where the alert is to be sent, when the alert is to be send, what content is to be included in the alert, etc.) of the alert 220 are required to comply with any stipulations or rules defined within the alert policy 215, including any policy definitions that were modified or changed based on the previous feedback 215B.

The alert 220 is then provided to a receiving entity in accordance with the alert policy 215. The alert provisioning engine 160 illustrated in FIG. 1 may be tasked with transmitting the alert to any number of different receiving entities via any type or number of communication channels.

In some cases, the alert 220 may be provided to the same client device engaged in generating the activity 205. In some cases, the alert 220 may additionally or alternatively be provided to an administrator tasked with receiving alerts related to specific events, such as the security incident 205A. In some cases, the alert 220 may additionally or alternatively be provided to a separate third-party device, user, or entity who is identified as having an interest in the usage context 205B of the resource and/or the activity 205 (which is associated with the usage context 205B). This third-party entity may be identified within the alert policy 215 or may be identified in another data structure established to record which entities are to receive alerts. Device(s) 195 in FIG. 1 are examples of these interested third parties.

Subsequent to issuing the alert 220 to the receiving entity or entities, process 200 involves receiving feedback 225, which is representative of feedback 190B from FIG. 1. To clarify, after a receiving entity receives the alert 220, that entity is provided the opportunity to comment or provide feedback regarding the alert attributes 220A of the alert 220. In accordance with the disclosed principles, the receiving entity can provide any amount of feedback for any number of different attributes included among the alert attributes 220A. The feedback 225 (e.g., a form of current client feedback) can be received in response to the alert 220 being sent to the client. In some cases (as will be described shortly), the alert policy is further modified in response to the current client feedback.

The feedback may include any type of comment, instruction, preference, or request. As one example, the feedback may indicate how the user would like to opt out of receiving subsequent alerts for activity involving or related to the usage context 205B. The feedback may include instructions to add or delete receiving entities. The feedback may include instructions to alter an appearance of the alert 220 or even to alter the contents of alert 220. Any aspect related to the alert 220 may be requested to be modified via the feedback 225. As described earlier, the feedback engine 165 may be tasked with obtaining, compiling, and categorizing the received feedback 225.

Subsequent to receiving feedback 225, process 200 includes an operation of updating the alert policy 215, as shown by update policy 230. Similar to how the alert policy 215 was previously updated in response to previous feedback 215B, the alert policy 215 can continue to be updated in response to feedback 225. Additionally, updating the alert policy 215 may include updating the alert triggering conditions 210, as shown by update 235.

One will appreciate how any number or any type of modification can be performed against the alert policy 215. FIG. 2 illustrates a few different action(s) 240 or modifications that may occur. Of course, these are examples only and should not be viewed as limiting the disclosure.

In particular, action(s) 240 that may be performed against the alert policy 215 include causing the alert policy 215 to continue to send 245 similar alerts based on similar activity (e.g., similar to activity 205) for activities involving the usage context 205B. Action(s) 240 include modifying attributes related to the alert and then sending the alert (as shown by modify & send 250). In some cases, the embodiments may modify the alert policy 215 so as to suspend 255 sending an alert for a determined time period. In some cases, the embodiments may modify the alert policy 215 so as to disable 260 sending subsequent alerts.

Machine learning 265, which will be discussed in more detail later, can also be used to intelligently learn which attributes of an alert are beneficial to users (e.g., user preferences) and which attributes are not. The machine learning 265 is also able to analyze feedback and to incorporate any requested alert configuration changes listed in the feedback into the alert policy.

One will appreciate that the embodiments are able to customize and tune the alert policy 215 over time as more feedback is received from users. In some instances, these customizations can be selectively applied to any number of other scenarios and applications.

Example Methods for Integrating Feedback

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
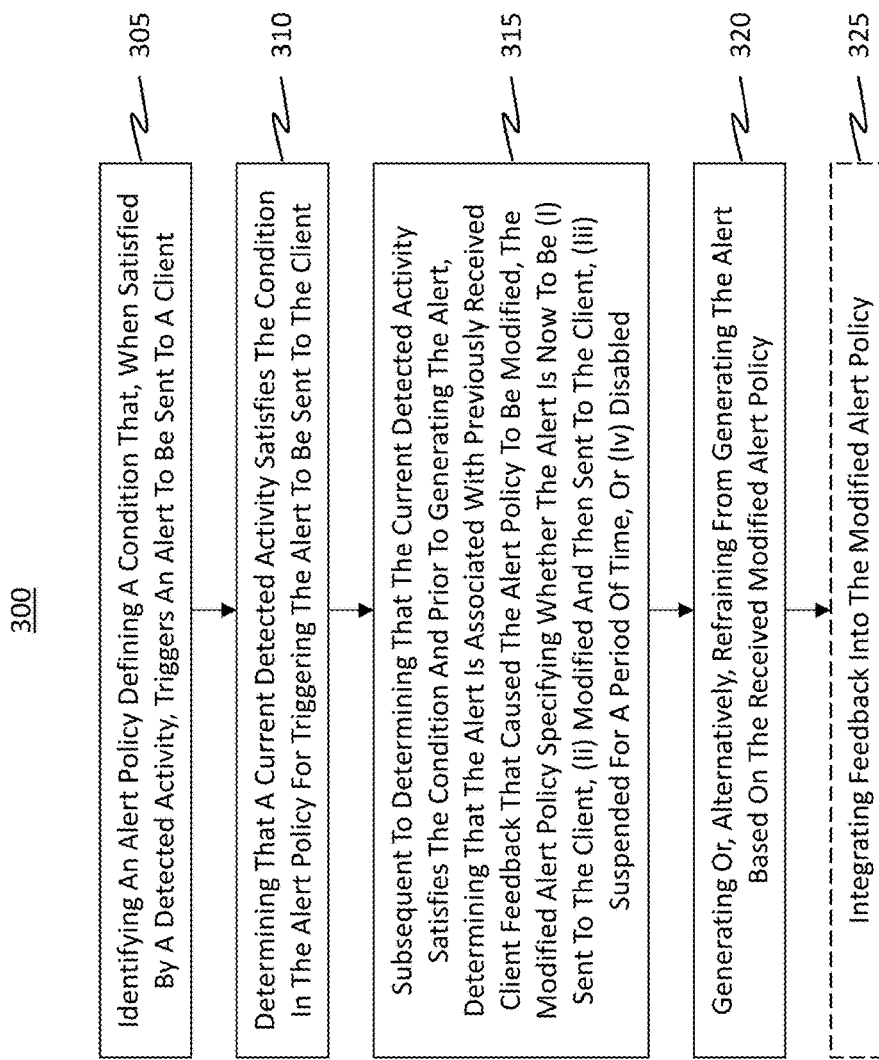
FIG. 3 illustrates a flow diagram of an example method for modifying alert policy to incorporate feedback.

FIG. 3 illustrates a flowchart of an example method 300 for integrating feedback into an alert management system. That is, FIG. 3 describes in method-form the operations that were described generally in FIG. 2.

Method 300 is performed by the alert service 140 described in FIG. 1. For instance, in some embodiments, portions of method 300 may be performed by the activity detection engine 150, the policy management engine 155, the alert provisioning engine 160, and the feedback engine 165. The dashboard 170 may also be involved in method 300.

Additionally, the alert service 140 (and thus method 300) can be performed by a cloud service operating in a cloud network or environment. In some embodiments, method 300 may be performed by a network device connected to any type of network. In some embodiments, the alert service 140 may have an instance executing on a local client device to perform method 300. Accordingly, method 300 may be performed by any type of computer system, without limitation.

Initially, method 300 includes an act (act 305) of identifying an alert policy (e.g., alert policy 215 from FIG. 2) defining a condition (e.g., alert triggering condition 210) that, when satisfied by a detected activity (e.g., activity 205), triggers an alert (e.g., alert 220) to be sent to a client (e.g., client 105 or client 110 from FIG. 1). Turning briefly to FIGS. 4A and 4B, these figures illustrate some of the different attributes that may be associated with an alert.

Specifically, FIG. 4A provides a generalized depiction of how an alert 400, which may be the alert mentioned in method 300 of FIG. 3, may be configured. Alert 400 is shown as including alert text 405, where the text describes the alert (e.g., why the alert is being raised, what activity triggered the alert, the timestamp of the alert, what resource is involved, etc.). Alert 400 may also indicate an alert type 410 (e.g., an informational-only type of alert, or a security alert, or an action-required alert). Alert 400 may also list or may be dependent on certain alert conditions 415, similar to the discussion provided in connection with alert triggering conditions 210 from FIG. 2. These conditions may be listed as content that is displayed with the alert 400.

Alert 400 may also include an indication of which entities received alert 400, as shown by alert parties 420. That is, in some cases, each entity receiving the alert 400 may be aware, via the list of alert parties 420, of the other entities that are also receiving the alert.

Alert 400 also includes selectable controls/options, which (when selected) enable a user to provide different types of feedback, including "+" feedback 425, "−" feedback 430, or custom feedback 435 controls. The "+" feedback 425 (a selectable control) can be used, when selected by the user, to indicate that the user of the client device has a positive response to the alert 400 whereas the "−" feedback 430 (another selectable control) can be used, when selected, to indicate that the user has a negative response to the alert 400. Custom feedback 435 is another selectable control which is provided to enable the user to select the control and then be presented a corresponding interface for providing a customized response or feedback regarding alert 400. It should be noted that any of the positive "+", the negative "−", or the custom feedback may be used to dynamically modify the alert policy or may be included in training data.

FIG. 4B shows a practical example of an alert 440, which may be representative of alert 400. Specifically, alert 440 includes alert text describing the alert (e.g., "An unfamiliar principal successfully logged on to SQL server 'test-server.'"). Alert 440 additionally includes various different details regarding the alert (e.g., an alert type, principal, server, subscription, time, etc.). FIG. 4B also shows a cluster 445 and a feature vector 450. These aspects will be discussed later in connection with some of the subsequent figures.

Returning to FIG. 3, method 300 includes an act (act 310) of determining that a current detected activity (e.g., activity 205 of FIG. 2) satisfies the condition in the alert policy for triggering the alert to be sent to the client.

Subsequent to determining that the current detected activity satisfies the condition and prior to generating the alert, method 300 includes an act (act 315) of determining that the current detected activity (e.g., activity 205 in FIG. 2) shares a relationship with previously received client feedback (e.g., previous feedback 215B) that caused the alert policy to be modified.

As an example, the previously received client feedback may have been submitted for the same usage context as that which is currently being invoked or used for the current detected activity. Stated differently, the current activity may involve using or accessing a set of functions or features for a resource. Use of these specific set of functions constitutes a particular usage context. The previously received client feedback may be associated with that same usage context. For instance, previous activity corresponding to the usage context may have been detected, and an alert may have been triggered. With that alert, the user may have submitted feedback, which means that the feedback is now associated with the usage context. In this regard, the current detected activity may share a relationship with the previous feedback by way of the usage context.

In this case, the alert policy (subsequent to being modified) now specifies whether the alert is to be (i) sent to the client, (ii) modified and then sent to the client, (iii) suspended for a period of time, or (iv) disabled. Act 320 then includes generating or, alternatively, refraining from generating the alert based on the alert policy.

Figures 5A, 5B:
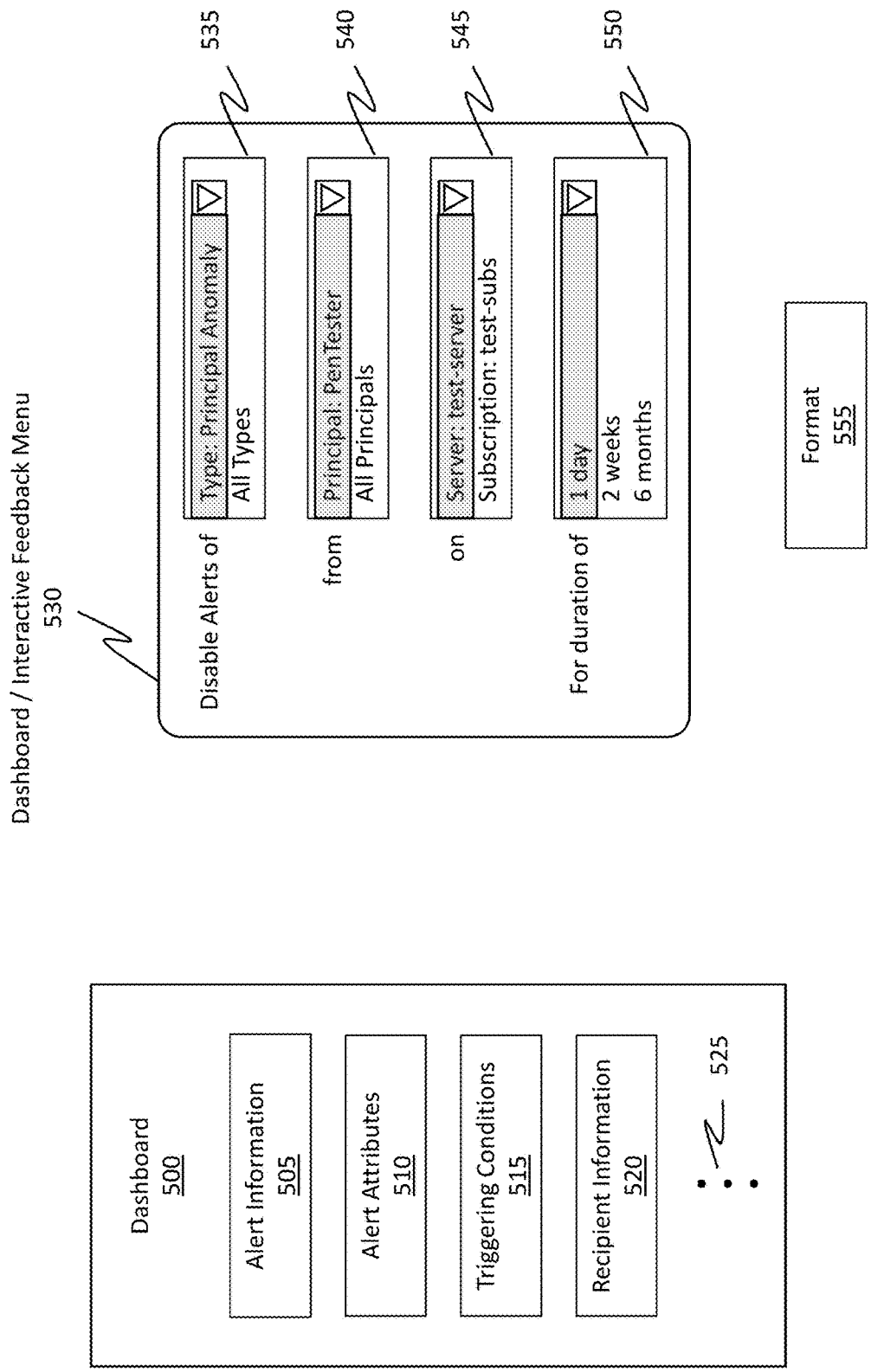
FIGS. 5A and 5B illustrate various features and characteristics of an interactive feedback menu (e.g., a dashboard) that may be provided to a user to enter feedback regarding an alert.

In some embodiments (though not all, as indicated by the dashed lines in act 325), method 300 may additionally include an act 325 of integrating newly received client feedback into the alert policy, which was previously modified by past feedback. To do so, the embodiments enable the user of the client device to access a so-called dashboard, as was described generally in FIG. 1 (e.g., Dashboard 170). FIGS. 5A and 5B provide heightened details regarding some example dashboards.

FIG. 5A illustrates a generalized dashboard 500. Dashboard 500 is accessible to a user of the client device that received the alert and is provided in response to a user selecting any one of the controls (e.g., −, +, custom), which are presented with the alert for example, to enable the user to enter specific feedback relating to the alert. The specific feedback may be directed to any number of alert attributes or features, including, for example, alert information 505 (i.e. the textual, visual, audio, or haptic information included in the alert), alert attributes 510 (e.g., the timestamp, the transmission protocol, the communication channel, the frequency of sending the alert, whether the alert will expire after a period of time, whether the user is required to acknowledge the alert, etc.), the triggering conditions 515 (as described earlier), and the recipient information 520. The ellipsis 525 illustrates how other attributes can also be identified by the user's feedback. By way of additional clarification, in response to receiving an alert, the user of the client device can submit feedback regarding the attributes of the alert in response to being presented a feedback interface (such as the dashboard interface 500) that is presented in response to a user selecting one of the feedback controls (425, 430, 435) presented to the user with the alert. The user can identify these attributes through use of the dashboard 500. In this manner, the user can provide feedback for any one or more of the topics or subject matter areas listed in FIG. 5A.

FIG. 5B provides a practical example of an example dashboard/interactive feedback menu 530, which is representative of dashboard 500. In some cases, this interactive feedback menu is provided in conjunction with an alert (e.g., is transmitted at a same time as the alert) and is configured to receive feedback detailing any requested alert configuration changes. In some embodiments, the dashboard is delivered to the user at a different time than when the alert was delivered to the user. In some cases, the dashboard may be sent to a different client device that is identified as belonging to the user. For instance, if the device that is engaged in interacting with the resource does not include a display (e.g., the embodiments are able to identify attributes associated with the client device), then the embodiments can elect to send the alert to a separate device that is still owned by the user and that does have a display to visualize the alert.

Here, dashboard/interactive feedback menu 530 includes an option 535 to disable alerts for specific recipients/principals, an option 540 to disable alerts from specific entities, an option 545 to disable alerts on specific instances, subscriptions, or accounts, and an option 550 to modify when or a duration of how long an alert is to be disabled. Of course, the user can provide feedback for other attributes of the alert.

The dashboard/interactive feedback menu 530 can be triggered for display in numerous different ways. In some cases, the menu is displayed automatically and without user interaction while in other cases the menu is displayed only after the user selects an option to display the menu. This option can be display simultaneously with the content of the alert and can even be displayed as a part of the alert.

Often, multiple alerts will be sent to multiple different client devices. Some of these alerts may actually correspond to the same user activity or the same usage context. Thus, these alerts may generally include the same information. In some cases, however, the format 555 (i.e. the visual appearance) of these different alerts can vary from one to the another. The format 555 is another attribute of the alert that a user is able to modify and adapt based on his/her preference.

Accordingly, in some embodiments, alert-related feedback can be collected via a dashboard (e.g., dashboard 500) that may be provided to at least one of potentially many clients. The format (e.g., format 555) of the dashboard can be dependent on the usage context of the resource such that different usage contexts result in different formats being used for dashboards. The different dashboards can be provided and displayed on the different clients to enable the user of those clients to enter feedback.

Additional Methods for Modifying Alert Policy

Figure 6A:
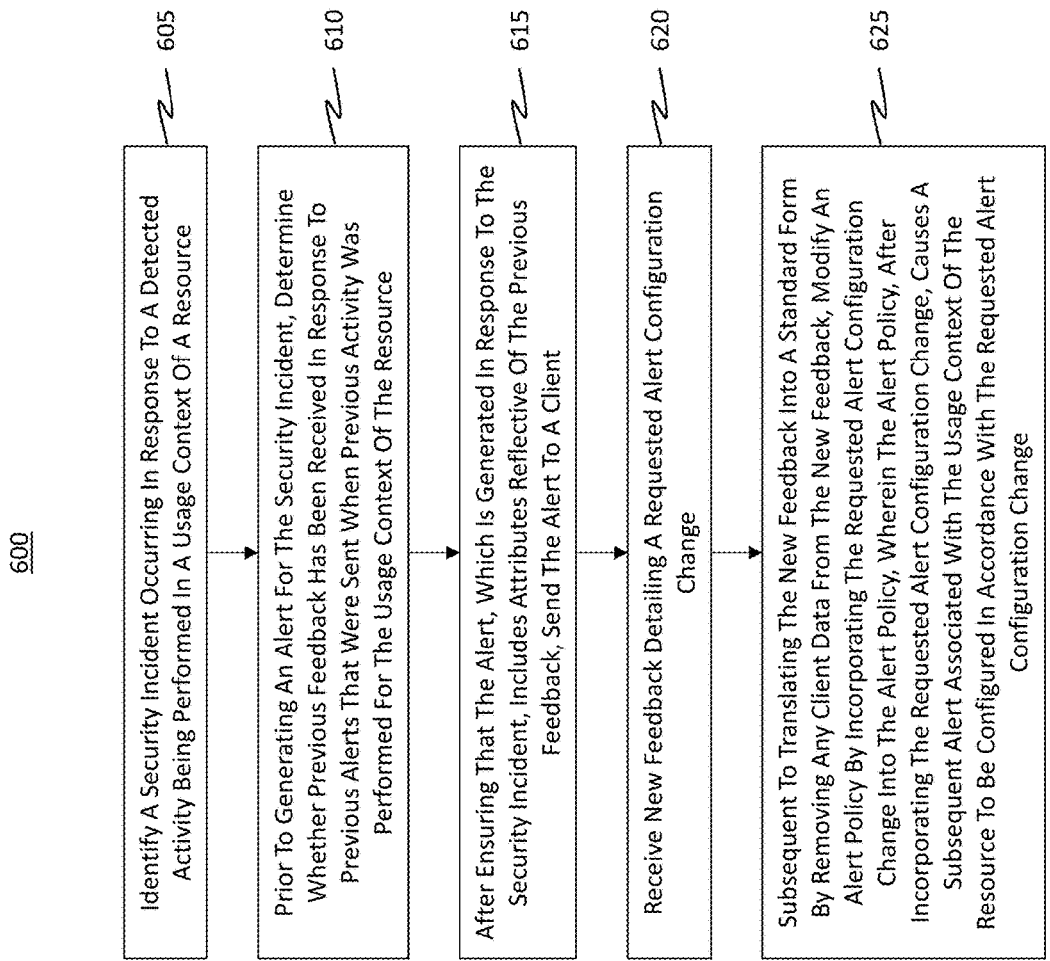
FIG. 6A illustrates a flowchart of an example method for modifying alert policies to incorporate changes that are provided based on alert-centric feedback.

FIG. 6A illustrates another flowchart of an example method 600 for intelligently integrating feedback into the alert system. Initially, method 600 includes an act (act 605) of identifying a security incident (e.g., security incident 205A of FIG. 2) occurring in response to a detected activity (e.g., activity 205) being performed in a usage context (e.g., usage context 205B) of a resource (e.g., resource 120 of FIG. 1).

Prior to generating an alert for the security incident, there is an act (act 610) of determining whether previous feedback (e.g., previous feedback 215B) has been received in response to previous alerts that were sent when previous activity was performed for the usage context of the resource. Act 610 can be performed at a time subsequent to the security incident being identified, but still before the alert is actually created. In this regard, there may be an interim period of time between the detection of the security incident and the formation of the alert.

After ensuring that the alert, which is generated in response to the security incident, includes attributes reflective of the previous feedback (i.e. the alert is structured to comply with the alert policy, as modified by the previous feedback), there is an act (act 615) of sending the alert to a client. In some embodiments, the alert is sent to only a single client whereas in other embodiments the alert is sent to multiple clients. In some cases, the alert will be formatted and will include the same information regardless of which client the alert is sent to while in other cases each alert will be individually tailored or customized based on policies that have been derived or developed for each one of those respective client devices. The process of ensuring that the alert reflects the previous feedback can be performed by comparing the attributes of the alert against the previous feedback to ensure that a threshold number of similarities between the attributes and the feedback are present. If the threshold number is satisfied, then the alert is ensured, if not, however, then the alert is not ensured.

In act 620, new feedback is received. This new feedback details a requested alert configuration change (e.g., alert configuration change 225A). Some examples of changes may include changes in timing as to when the alert should be sent (e.g., within a predetermined time period subsequent to the security incident being identified, changes to a format of the alert, changes to the information included in the alert, changes to how the user is notified regarding the presence of the alert, and so forth). These requested changes can include changes having various different granularities, with some changes being specifically focused on a particular aspect of the alert while other changes being broad in nature and generally applicable to any number of different alerts.

Subsequent to translating the new feedback into a standard form (e.g., by removing any client data from the new feedback), there is an act (act 625) of modifying an alert policy by incorporating the requested alert configuration change into the alert policy. Here, the alert policy, after incorporating the requested alert configuration change, causes a subsequent alert associated with the usage context of the resource to be configured in accordance with the requested alert configuration change. In performing these operations, the alert policy can be periodically and/or continuously updated to reflect specific user preferences and/or collective user preferences. Additionally, the embodiments are able to dynamically learn (e.g., via machine learning 265 mentioned in FIG. 2) which attributes of an alert are determined to be beneficial to users and which attributes are not beneficial.

As used herein, reference to any type of machine learning may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

Figure 6B:
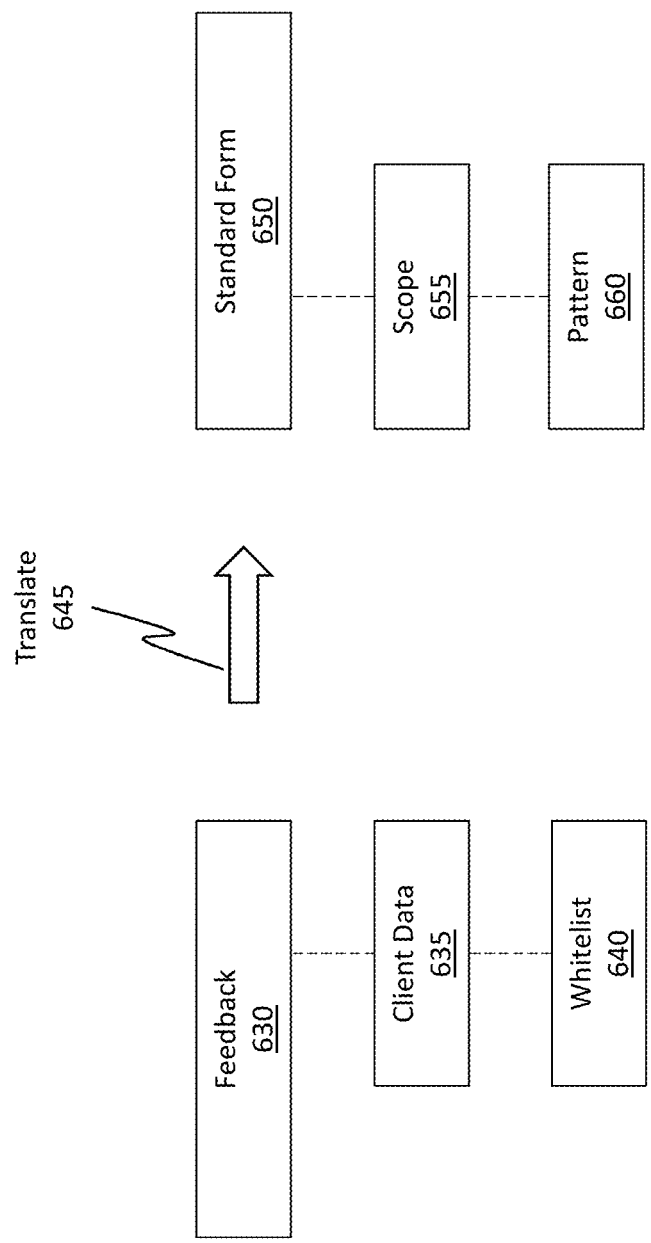
FIG. 6B illustrates how the alert feedback can be translated into a standard form so it can then be used for other clients.

FIG. 6B provides additional detail regarding how feedback can be translated into a standard form. Specifically, FIG. 6B shows how feedback 630 may, in some instances, include client data 635 (e.g., a name of the client, an IP address of the client's device, a geographic location of the device, a MAC address or MSISDN of the device, and so forth). Additionally, in some cases, the feedback 630 may include other information, such as a whitelist 640 indicating that certain devices or activities should be considered safe and that subsequent alerts should not be generated for those whitelisted devices or activities. The whitelist 640 may be temporary for a set duration of time or it may be indefinite until later modified.

In some cases, the new (or perhaps previous) feedback indicates that a certain detected activity is to be whitelisted. As a consequence, the feedback indicates that subsequent alerts should be prevented from being sent to the client when subsequent activity corresponding to the whitelisted activity is detected.

As described in method 600, the embodiments are able to translate 645 the feedback 630 into a standard form 650. By translate 645, it is meant that the client data 635 is scrubbed, extracted, removed, or otherwise deleted from the feedback 630 for privacy reasons. That is, in some embodiments, prior to being included in a collection of feedback, the alert-related feedback that was provided from the clients was scrubbed to remove client-specific data. Additionally, in some cases feedback 630 may have included unstructured data. During the translation, any unstructured data is analyzed and given structure (e.g., by model fitting the data into different model categories or classifications).

One benefit that may occur as a result of translating the feedback includes allowing or enabling knowledge transfer. Since the platform or system is standardized, specific patterns of changes chosen by a client can be transferred, as a recommendation or as default settings, to other clients in similar situations (e.g., similar configuration of applications receiving similar sets of alerts). This allows effective propagation of knowledge among clients, leverages the advantages of cloud services, and helps in building a learning and adaptive platform for activity detection, including threat detection. The scope 655, therefore, represents how the standard form 650 can be provided to other clients based on a pattern 660 recognized in the feedback and/or in the similarities between clients.

In some embodiments, as a result of the feedback being translated into the standard form (such that client data is removed from the new feedback), a pattern of change (e.g., pattern 660) provided by the translated new feedback is permitted to be migrated to a separate client. Here, the separate client may have been identified as a result of it sharing one or more common characteristics with the original client.

The disclosed embodiments allow effective propagation of knowledge among customers and can leverage the advantages of cloud service to help build a learning and adaptive platform for activity detection. Optimally, the shared rules, policies, and feedback can be added proactively as suggested default settings for new customers on boarding to the activity detection services.

For example, if a sufficient number of existing customers from a specific region choose to silence 'new user' alerts for sources in a specific IP range, this exclusion can be propagated to all customers from that area (the reason might be because the range belongs to a known and benign local service).

Furthermore, the standardized feedback can be automatically used to generate labels, which may be used by detection logic to learn and model optimization processes. Doing so helps improve the accuracy of the activity detection algorithm (e.g., by decreasing false positive rates without increasing false negative rates) and allows use of a bigger pool of algorithms (e.g., a so-called "semi-supervised approach").

In some embodiments, the semi-supervised approach is performed by respectively using the standardized feedback as more advanced labels (in comparison to simple positive/negative ones) for the detection algorithms. Such a practice is particularly suitable for the semi-supervised model, due to scarcity of available feedback (empirically, only about 0.7% of generated alerts receive feedback), which make the supervised approach more difficult to implement due to the lack of available data.

The semi-supervised approach, on the other hand, relies on defining a subset of alerts that share the same labels. Two approaches, which are discussed below, can be applied independently or together to implement this semi-supervised approach.

In the first approach, alerts can be defined using a feature vector (e.g., feature vector 450 from FIG. 4B) describing the specific alert and its context. As used herein, a "feature vector" is a type of vector structure configured to describe an object's relevant or important characteristics. These alerts are then clustered to enable the semi-supervised approach.

In the second approach, different precursor signals or generated alerts can be combined into multivariate alerts and used to propagate the labels. For example, this can be used in combination with a multivariate model formulation technique. The expansion from a common unsupervised model to a semi-supervised model allows for increased quality improvements of the detection logic.

Accordingly, one will appreciate that, as a result of translating the new feedback into the standard form (e.g., by removing any client data from the new feedback), the translated new feedback is permitted to be used outside of a scope (e.g., scope 655) of the client and instead can be broadly used by numerous other clients. In this manner, the translated new feedback is permissible for use with other clients and can be readily propagated.

Aggregating Alerts

Figure 7:
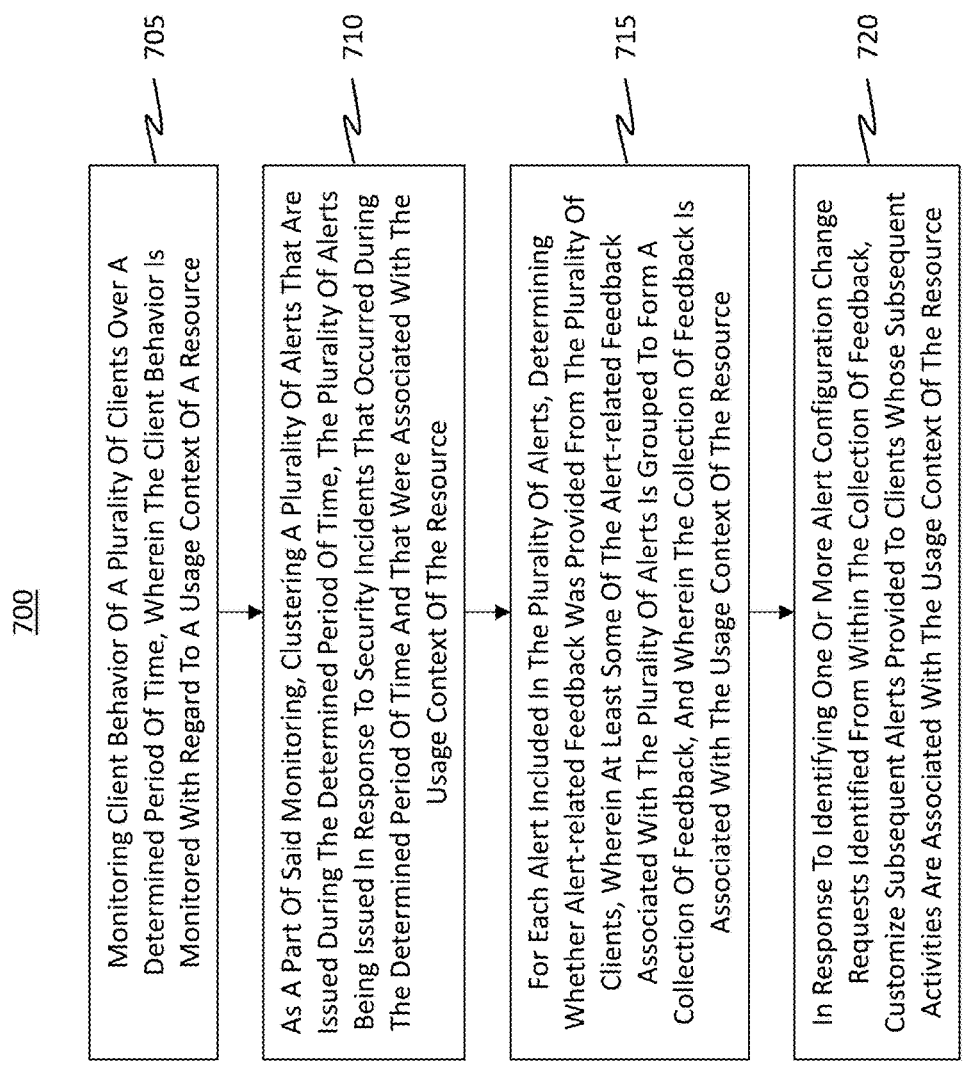
FIG. 7 illustrates a flowchart of an example method for clustering alerts and analyzing feedback associated with those alerts in order to intelligently modify a set of alert policies.

Attention will now be directed to FIG. 7, which illustrates a flowchart of an example method 700 for training a computer system or machine learning algorithm to generate customized alerts for users who are requesting access to resources. Similar to the other methods, method 700 may also be performed by the alert service 140 and/or any of the disclosed machine learning algorithms.

Initially, method 700 includes an act (act 705) of monitoring client behavior (e.g., activity 205 from FIG. 2) of a plurality of clients over a determined period of time. The client behavior is monitored with regard to a usage context of a resource, as described earlier. Behavioral data can be included in the user activity data 180 of FIG. 1.

As a part of this monitoring process, there is an act (act 710) of clustering a plurality of alerts that are issued during the determined period of time. These alerts are issued in response to security incidents that occurred during the determined period of time and that were associated with the usage context of the resource. By "clustering" it is generally meant that these alerts are grouped together based on characteristics or attributes that are associated with those alerts. Alerts sharing similar characteristics can be clustered within the same group. Any clustering technique may be used such as, but not limited to, k-means clustering, mean-shift clustering, density-based spatial clustering, expectation-maximization clustering, and agglomerative hierarchical clustering. In some embodiments, clustering the alerts is performed using a feature vector describing each one of the alerts and the usage context.

For each one of these alerts, an act (act 715) is performed in which a determination is made as to whether alert-related feedback was provided from the clients. Notably, at least some of the alert-related feedback associated with the alerts is grouped to form a collection or a corpus of feedback. Because the user behavior and activity were associated with a specific usage context of the resource, the resulting collection of feedback is also associated with the usage context of the resource.

In response to identifying one or more alert configuration change requests identified from within the collection of feedback, there is an act (act 720) of customizing subsequent alerts provided to clients whose subsequent activities are associated with the usage context of the resource. These customizations can include any of the modifications that were discussed earlier.

Accordingly, the disclosed embodiments improve the current technology by intelligently integrating feedback into an alert management service or system. Some benefits are specifically achieved as a result of consulting or evaluating the policy, even before an alert is generated, to determine whether past feedback has been received. By performing such an operation, the embodiments ensure that the most up-to-date alert policy will be implemented and executed in subsequently delivering alerts to clients.

As indicated above, some embodiments rely on specific timing with regard to the disclosed operations. For instance, in some embodiments, subsequent to an alert being sent to a client, current feedback is then received, where the current feedback specifies one or more changes that the client is requesting be made to the alert. These embodiments may then further modify the alert policy based on the current feedback to incorporate or integrate the one or more changes into the policy. Later, the embodiments can determine whether a subsequent activity satisfies a new condition defined by the newly modified alert policy. Then, prior to generating a new alert to the client or to another client, the embodiments can determine whether to (i) send, (ii) modify and then send, (iii) suspend, or (iv) disable the new alert based on the newly modified alert policy. As reflected above, various different timing aspects may be followed in the disclosed operations.

The disclosed embodiments significantly improve customer satisfaction by allowing interactive control of received alerts, less alert churn, and improved alert quality. These improvements help to close a gap between generic alerts used in a cloud environment and personalized alerts used in certain applications.

Example Computer/Computer Systems

Figure 8:
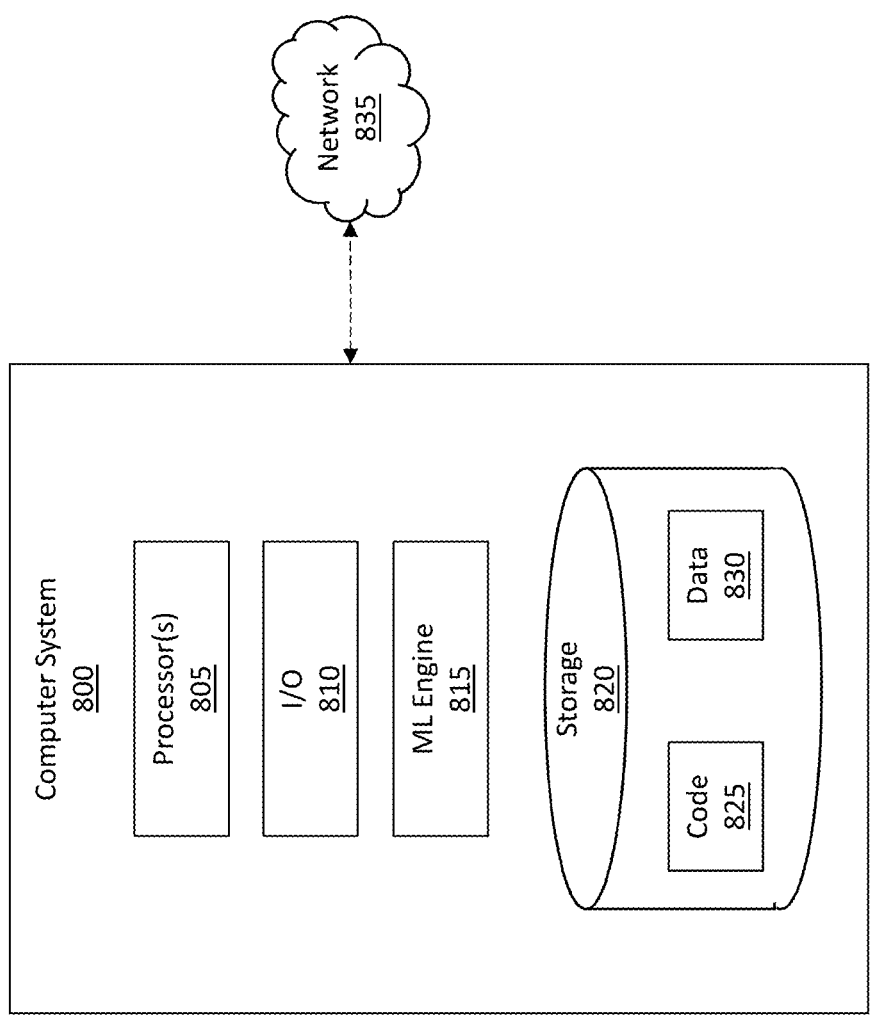
FIG. 8 illustrates an example computer system that comprises and/or that may be used to implement the disclosed operations and embodiments.

Attention will now be directed to FIG. 8 which illustrates an example computer system 800 that may include and/or be used to perform any of the operations described herein. Computer system 800 may be included within architecture 100 and may execute the alert service 140 and/or the resource 120. In some cases, the client devices may be embodied as the computer system 800.

Computer system 800 may take various different forms. For example, computer system 800 may be embodied as a tablet, a desktop, a laptop, a mobile device, or a standalone device. Computer system 800 may also be a distributed system that includes one or more connected computing components/devices that are in communication with computer system 800.

In its most basic configuration, computer system 800 includes various different components. FIG. 8 shows that computer system 800 includes one or more processor(s) 805 (aka a "hardware processing unit"), input/output "I/O" 810, a machine learning (ML) engine 815, and storage 820.

Regarding the processor(s) 805, it will be appreciated that the functionality described herein can be performed, at least in part, by one or more hardware logic components (e.g., the processor(s) 805). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

The I/O 810 includes any type of input or output device. Such devices include, but are not limited to, touch screens, displays, a mouse, a keyboard, and so forth. Any type of input or output device should be included among I/O 810, without limitation.

The ML engine 815 is configured in the manner described earlier and may be implemented as a specific processing unit (e.g., a dedicated processing unit as described earlier) configured to perform one or more specialized operations for the computer system 800. As used herein, the terms "executable module," "executable component," "component," "module," or "engine" can refer to hardware processing units or to software objects, routines, or methods that may be executed on computer system 800. The different components, modules, engines, and services described herein may be implemented as objects or processors that execute on computer system 800 (e.g. as separate threads). The ML engine 815 (or perhaps even just the processor(s) 805) can be configured to perform any of the disclosed method acts or other functionalities.

Storage 820 may be physical system memory, which may be volatile, non-volatile, or some combination of the two. The term "memory" may also be used herein to refer to non-volatile mass storage such as physical storage media. If computer system 800 is distributed, the processing, memory, and/or storage capability may be distributed as well.

Storage 820 is shown as including executable instructions (i.e. code 825). The executable instructions represent instructions that are executable by the processor(s) 805 (or perhaps even the ML engine 815) of computer system 820 to perform the disclosed operations, such as those described in the various methods. Storage 820 also includes data 830, which is representative of any of the stored data mentioned throughout this disclosure, such as the user activity data 180 and the policy 185 in FIG. 1.

The disclosed embodiments may comprise or utilize a special-purpose or general-purpose computer including computer hardware, such as, for example, one or more processors (such as processor(s) 805) and system memory (such as storage 820), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that carry computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 800 may also be connected (via a wired or wireless connection) to external sensors (e.g., one or more remote cameras) or devices via a network 835. For example, computer system 800 can communicate with any number devices (e.g., device(s) 195 in FIG. 1 or clients 105 and 110) or cloud services to obtain or process data. In some cases, network 835 may itself be a cloud network. Furthermore, computer system 800 may also be connected through one or more wired or wireless networks 835 to remote/separate computer systems(s) that are configured to perform any of the processing described with regard to computer system 800.

A "network," like network 835, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 800 will include one or more communication channels that are used to communicate with the network 835. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for managing alert processes based on integrated feedback, the method comprising:
   identifying an alert policy defining a condition that, when satisfied by a detected activity, triggers an alert to be sent to a client;
   detecting a first activity; determining that the first activity satisfies the condition in the alert policy;
   generating and sending a first alert to the client, the first alert indicating that the first activity that satisfies the condition in the alert policy has been detected;
   receiving a client feedback from the client, indicating at least whether the first alert is false positive;
   modifying the alert policy based on the client feedback, the modified alert policy now specifying whether an alert is to be (i) sent to the client, (ii) modified and then sent to the client, (iii) suspended for a period of time, or (iv) disabled;
   subsequent to modifying the alert policy,
      detecting a second activity;
      determining that the second activity satisfies the condition;
      prior to generating a second alert, determining that the second activity shares a relationship with previously received client feedback that caused the alert policy to be modified; and
      generating or, alternatively, refraining from generating the second alert based on the modified alert policy, wherein,
      the client feedback is translated into a standard form by removing client data from the client feedback to generate a translated new feedback that omits the client data that is removed, and
      as a result of the client feedback being translated into the standard form such that client data is removed from the client feedback, a pattern of change provided by the translated new feedback is permitted to be migrated to a separate client that is identified as sharing one or more common characteristics as the client and without sharing the removed client data with the separate client.

2. The method of claim 1, wherein the method includes generating an alert.

3. The method of claim 2, wherein the method further includes modifying, based on the alert policy, an instruction indicating at least one of: how the alert is to be presented, when the alert is to be presented, or to which set of one or more clients the alert is to be presented.

4. The method of claim 3, wherein the previously received client feedback was previously received in response to a previously generated alert, the previously generated alert sharing one or more common attributes with the alert, and wherein the previously generated alert was provided to a previous client based on a particular activity that was being performed and that satisfied the condition.

5. The method of claim 4, wherein current client feedback is received in response to the alert being sent to the client, and wherein the alert policy is further modified in response to the current client feedback.

6. The method of claim 2, wherein the method further includes:
   subsequent to the alert being sent to the client, receiving current feedback specifying one or more changes that the client is requesting be made to the alert;
   further modifying the alert policy based on the current feedback to incorporate the one or more changes;
   determining whether a subsequent activity satisfies a new condition that is defined by the newly modified alert policy; and
   prior to generating a new alert to the client or to another client, determining whether to (i) send, (ii) modify and then send, (iii) suspend, or (iv) disable the new alert based on the newly modified alert policy.

7. A computer system comprising:
   a processor; and
   a hardware storage device having stored thereon computer-executable instructions that are executable by the processor to cause the computer system to:
      identify a first security incident occurring in response to a detected first activity being performed in a usage context of a resource;
      generate a first alert based on an alert policy;
      send the first alert to a client;
      receive feedback from the client, the feedback detailing a requested alert configuration change;
      translate the feedback into a standard form by removing any client data from the feedback;
      modify the alert policy by incorporating the requested alert configuration change into the alert policy;
      subsequent to modifying the alert policy,
         identify a second security incident occurring in response to a second detected activity being performed in the usage context of a resource;
         generate a second alert based on the modified alert policy, such that the second alert incorporates the requested alert configuration change,
         wherein as a result of the feedback being translated into the standard form such that client data is removed from the feedback, a pattern of change provided by the translated new feedback is permitted to be migrated to a separate client, and wherein the separate client is identified as sharing one or more common characteristics as the client.

8. The computer system of claim 7, wherein the resource is a user account or a server computer system.

9. The computer system of claim 7, wherein the requested alert configuration change requests that subsequent alerts associated with the usage context of the resource should be prevented from being sent to the client.

10. The computer system of claim 7, wherein, as a result of translating the feedback into the standard form by removing any client data from the feedback, the translated feedback is permitted to be used outside of a scope of the client such that the translated feedback is permissible for use with other clients.

11. The computer system of claim 7, wherein the feedback indicates that the detected activity is to be whitelisted such that the feedback indicates subsequent alerts should be prevented from being sent to the client when subsequent activity corresponding to the detected activity is detected.

12. The computer system of claim 7, wherein an interactive feedback menu is provided with the first alert, the interactive feedback menu being configured to receive the feedback detailing the requested alert configuration change.

13. The computer system of claim 7, wherein machine learning is used to analyze the feedback and to incorporate the requested alert configuration change into the alert policy.

14. The computer system of claim 7, wherein the alert policy is applicable to a plurality of clients, including the client.

\* \* \* \* \*